US007765522B2

(12) United States Patent
Banavar et al.

(10) Patent No.: US 7,765,522 B2
(45) Date of Patent: Jul. 27, 2010

(54) SYSTEM AND METHOD FOR PROVIDING AN EMBEDDED COMPLETE CONTROLLER SPECIFICATION THROUGH EXPLICIT CONTROLLER OVERLAYS

(75) Inventors: Guruduth Somasekhara Banavar, Yorktown Heights, NY (US); Richard J. Cardone, Mahopac, NY (US); Juan Manuel Huerta, Riverdale, NY (US); Danny Soroker, Larchmont, NY (US)

(73) Assignee: International Business Machines Corporation, Armonk, NY (US)

( * ) Notice: Subject to any disclaimer, the term of this patent is extended or adjusted under 35 U.S.C. 154(b) by 1072 days.

(21) Appl. No.: 10/930,168

(22) Filed: Aug. 31, 2004

(65) Prior Publication Data

US 2006/0095892 A1 May 4, 2006

(51) Int. Cl.
*G06F 9/44* (2006.01)
(52) U.S. Cl. .................. 717/105; 717/109; 717/123
(58) Field of Classification Search ........................ None
See application file for complete search history.

(56) References Cited

U.S. PATENT DOCUMENTS

| 6,996,800 B2* | 2/2006 | Lucassen et al. ............. 717/106 |
| 7,225,424 B2* | 5/2007 | Cherdron et al. ............. 717/104 |
| 2002/0194388 A1* | 12/2002 | Boloker et al. .............. 709/310 |
| 2003/0023953 A1* | 1/2003 | Lucassen et al. ............. 717/106 |
| 2003/0046316 A1* | 3/2003 | Gergic et al. ................ 707/513 |
| 2004/0064802 A1* | 4/2004 | Cherdron et al. ............. 717/100 |
| 2005/0273759 A1* | 12/2005 | Lucassen et al. ............. 717/105 |

OTHER PUBLICATIONS

"Model-View-Controller", http://ootips.org/mvc-pattern.html, May 14, 1998, pp. 1-3.
"The Model-View-Controller Design Pattern", Cocoa: Application Architecture: The Model-View-Controller Design Pattern, http://developer.apple.com/documentation/Cocoa/Conceptual/ApPArchitecture/Concepts/..., pp. 1-3.
"Model View Controller", Model-View-Controller framework, http://www.object-arts.com/EducationCentre/Overviews/MVC.htm, pp. 1-3.
"4.4 Web-Tier Application Framework Design", Designing Enterprise Applications with the J2EE Platform, Second Edition, Sun Microsystems, 2002, http://java.sun.com/blueprints/guidelines/designing_enterprise_applications_2e/web-tier/w...pp. 1-23.

* cited by examiner

*Primary Examiner*—Tuan Q Dam
*Assistant Examiner*—Evral Bodden
(74) *Attorney, Agent, or Firm*—Yee & Associates, P.C.; Anne V. Dougherty

(57) ABSTRACT

A system and method to support embedded complete controller specification through explicit controller overlays are provided. The system and method partitions the controller layer of the MVC into a plurality of controller overlays. For example, a macro controller overlay, micro controller overlay, and global controller overlay are established for specifying macro controller objects, micro controller objects and global controller objects. Editors are provided for each of the plurality of controller overlays. The combination of the micro control overlay, macro control overlay, and global control overlay results in a complete controller specification for an application.

18 Claims, 6 Drawing Sheets

SYSTEM AND METHOD FOR PROVIDING AN EMBEDDED COMPLETE CONTROLLER SPECIFICATION THROUGH EXPLICIT CONTROLLER OVERLAYS

BACKGROUND OF THE INVENTION

1. Technical Field

The exemplary embodiments of the invention are generally related to an improved data processing system. More specifically, the exemplary embodiments of the invention are directed to a method and system for generating a complete controller specification using controller overlays for defining an application.

2. Description of Related Art

The Model-View-Controller (MVC) is a known architecture for specifying the operation of an application and its representation via a graphical user interface (GUI). The MVC paradigm is a way of breaking an application, or even just a portion of an application's interface, into three parts: the model, the view, and the controller. MVC was originally developed to map the traditional input, processing, output roles into the GUI realm. The user input, the modeling of the external world, and the visual feedback to the user are separated and handled by model, view and controller components. For example, the controller interprets mouse and keyboard inputs from the user and converts these user actions into commands that are sent to the model and/or view components to effect the appropriate change. The model manages one or more data elements, responds to queries about its state, and responds to instructions that change state. The view component manages the display and presentation of data to the user through a combination of graphics and text.

Model components, which are typically generated as model objects in an object-oriented environment, represent special knowledge and expertise. The model objects hold an application's data and define the logic that manipulates that data. A well-designed MVC application has all its important data encapsulated in model objects. Any data that is part of the persistent state of the application (whether that persistent state is stored in files, databases, etc.) reside in the model objects once the data is loaded into the application.

Ideally, a model object has no connection to the user interface used to present and edit it. For example, if a model object represents a person, it may be desirable to store the person's birth date in the person model object. However, storing a date format string or other information on how that date is to be presented is better off in a different portion of the MVC architecture than the model object. In general, a model object should not be concerned with interface and presentation issues.

A view object knows how to display and possibly edit data from the application's model. The view should not be responsible for storing the data it is displaying. A view object can be in charge of displaying just one part of a model object, or a whole model object, or even many different model objects. View objects tend to be reusable. That is, the same view object may be used in a plurality of different applications to generate similar view components in a graphical user interface.

The controller object acts as the intermediary between the application's view objects and its model objects. Typically, controller objects have logic in them that is specific to an application. Controllers are often in charge of making sure the views have access to the model objects they need to display and often act as the conduit through which views learn about changes to the model.

By confining application-specific code to controller objects, model and view objects are more general and reusable. Controllers are often the least reusable objects in an application. The controller objects frequently contain many lines of code. To make this quantity of code more manageable, it is sometimes useful to separate controller objects into "model controllers" and "view controllers."

A model controller is a controller that concerns itself mostly with the model layer. Its primary responsibilities are to manage the model and communicate with any view controller objects. Action methods that apply to the model as a whole will typically be implemented in a model controller.

A view controller is a controller that concerns itself mostly with the view layer. Its primary responsibilities are to manage the interface and communicate with the model controller. Action methods concerned with data displayed in a view will typically be implemented in a view controller.

Thus, in known MVC architecture based systems, applications are broken into three layers of abstraction for ease in developing and specifying these applications. These three layers are the model layer, the view layer and the controller layer.

SUMMARY OF THE INVENTION

While the Model-View-Controller architecture provides an abstraction that aids in the development of many applications, as applications become more complex, they become more difficult to generate using this known architecture. This is especially true for the controller layer which encapsulates the application specific code. In view of these problems, it would be beneficial to have an improved system and method for specifying the controller layer of an application developed using the MVC architecture. More specifically, it would be beneficial to have a system and method that permits specifying a complete controller through a plurality of explicit controller overlays.

The exemplary embodiments of the invention are directed to a system and method to support embedded complete controller specification through explicit controller overlays. The system and method of the exemplary embodiments partition the controller layer of the MVC into a plurality of controller overlays. For example, a macro controller overlay, micro controller overlay, and global controller overlay are established for specifying macro controller objects, micro controller objects and global controller objects. Editors are provided for each of the plurality of controller overlays.

The macro control overlay refers to the classic transition of the application from one state, view, page or dialog into another. The micro control overlay permits interaction mechanisms to provide their own flow control that is not visible to other layers of control. The micro control overlay can be specific to particular modalities, such as speech or graphical modalities. The global control overlay refers to the meta-control of an application that allows users to override the macro or micro control layers. For example, global control overlay allows a user to preempt normal application flow to execute global help, stop an application, resume an application, or to restart an application from the beginning.

The combination of the micro control overlay, macro control overlay, and global control overlay results in a complete controller specification for an application. The separation of the controller layer into these overlays permits increased reuse of objects from each of these overlays, specification of controllers with regard to specific modalities of input/output, and overall ease of designing and integrating controller objects into the application model.

These and other features and advantages of the exemplary embodiments of the invention will be described in, or will become apparent to those of ordinary skill in the art in view of, the following detailed description of the preferred embodiments.

BRIEF DESCRIPTION OF THE DRAWINGS

The exemplary aspects of the invention will best be understood by reference to the following detailed description when read in conjunction with the accompanying drawings, wherein.

DETAILED DESCRIPTION OF THE EXEMPLARY EMBODIMENTS

Figure 1:
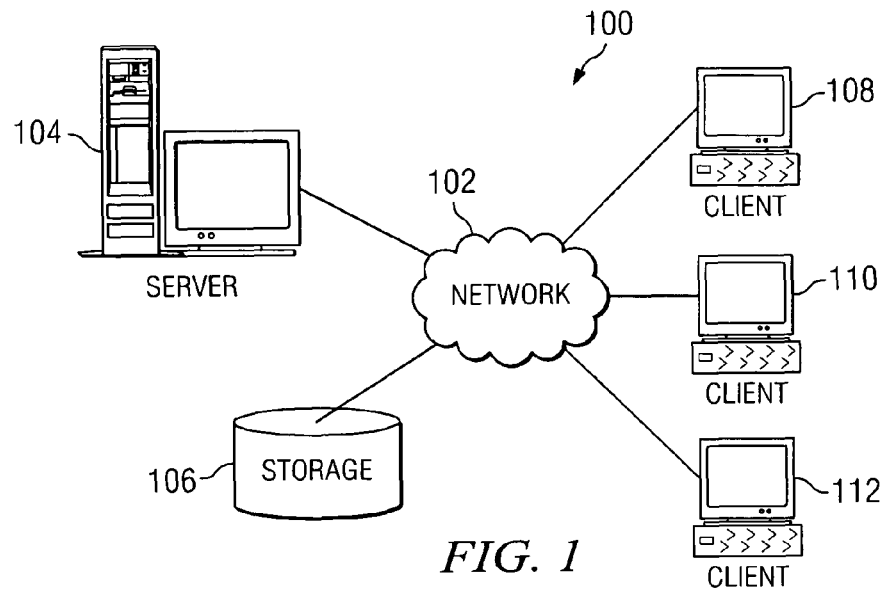
FIG. 1 is an exemplary diagram of a distributed data processing system in which exemplary aspects of the invention may be implemented.
Figure 2:
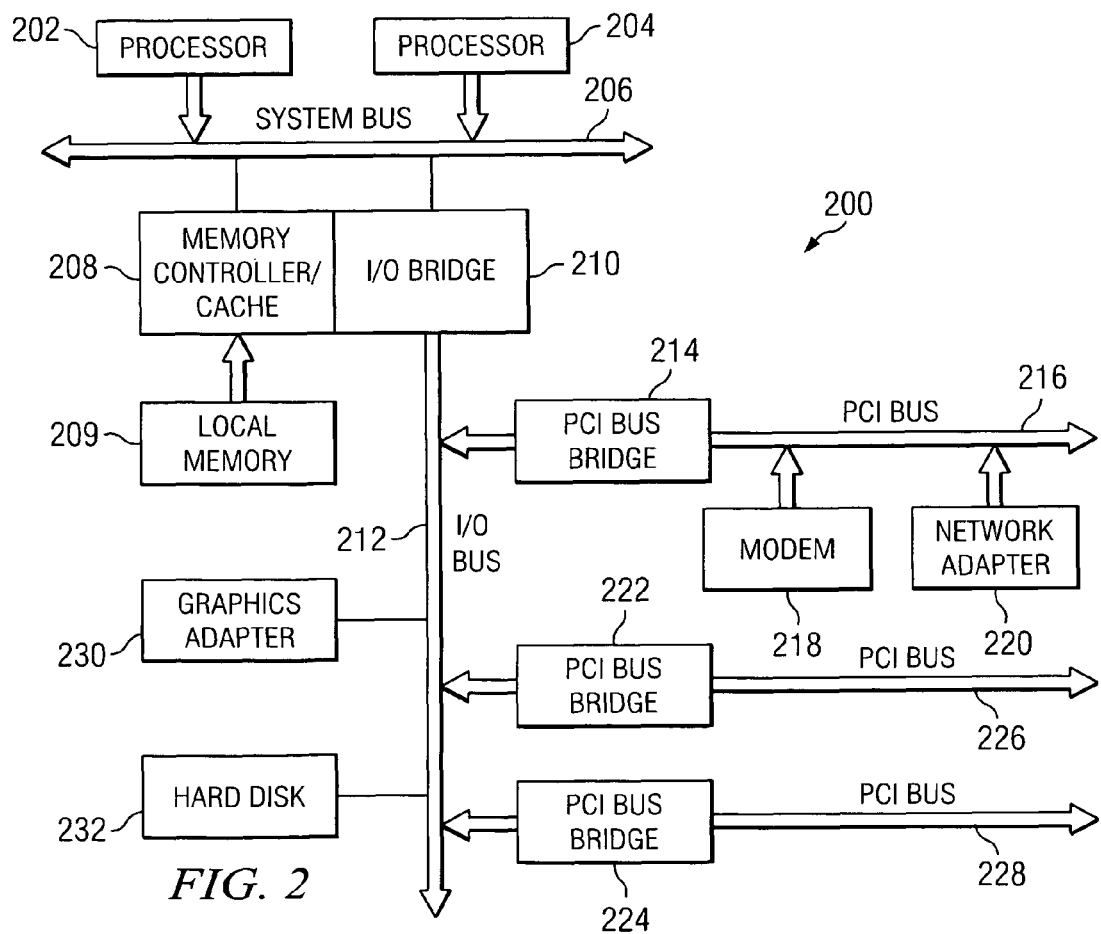
FIG. 2 is an exemplary diagram of a server computing device in which exemplary aspects of the invention may be implemented.
Figure 3:
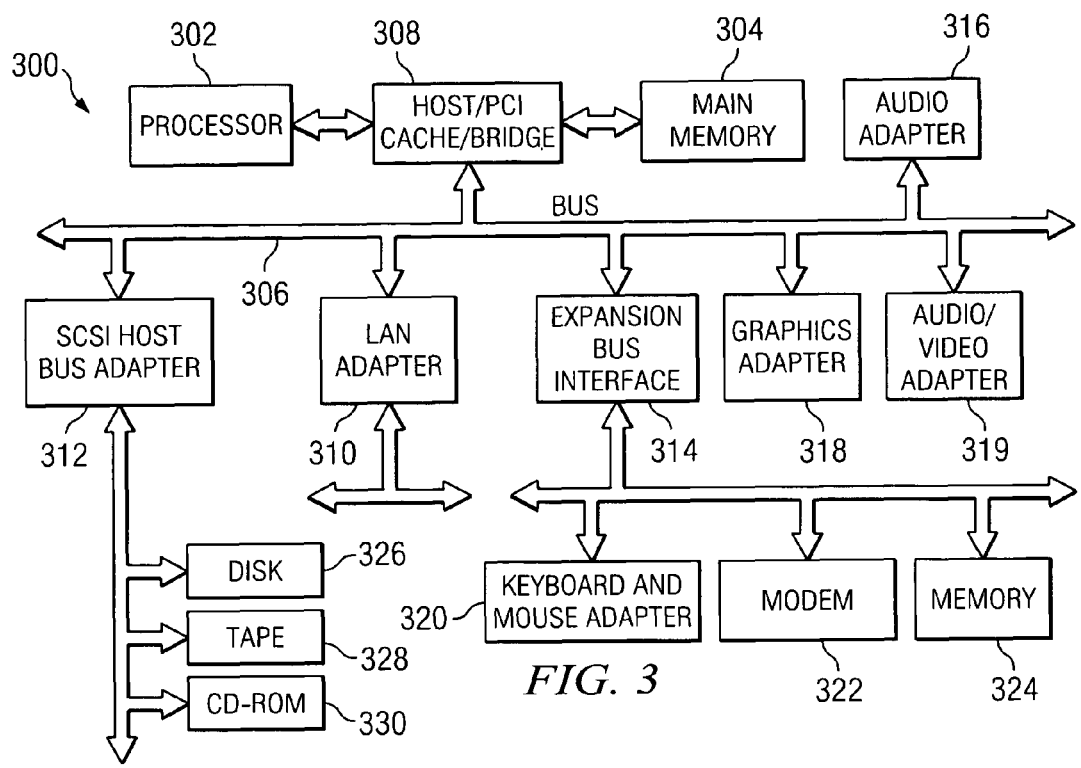
FIG. 3 is an exemplary diagram of a client computing device in which exemplary aspects of the invention may be implemented.

The exemplary embodiments of the invention are directed to a system and method for supporting complete controller specification through explicit controller overlays. The exemplary aspects of the invention may be implemented in a single computing device or in a distributed data processing system. For example, the tools according to the exemplary aspects of the invention may be present on a server computing system that is accessible by one or more client computing systems for the development of applications in a distributed data processing system. Therefore, the following FIGS. 1-3 are provided as an example of the environment in which the exemplary aspects of the invention may be implemented. It should be appreciated that FIGS. 1-3 are only exemplary and many modifications to these exemplary environments may be made without departing from the spirit and scope of the present invention.

With reference now to the figures, FIG. 1 depicts a pictorial representation of a network of data processing systems in which the exemplary aspects of the invention may be implemented. Network data processing system 100 is a network of computers in which the exemplary aspects of the invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with one exemplary embodiment of the invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the exemplary aspects of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the exemplary embodiments of the invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The exemplary embodiments of the invention provide a system and method to support embedded complete controller specification through explicit controller overlays. Components of the exemplary embodiments of the invention may be provided on one or more server computing device, such as server computing device 104, accessible by one or more client devices, such as client devices 108, 110 and 112, or in a stand-alone computing device. The system and method of the exemplary embodiments of the invention provide a model-view-controller (MVC) tool for developing applications, such as Internet based applications. The MVC tool according to exemplary embodiments of the invention partitions the controller layer of the MVC tool into a plurality of controller overlays. For example, in one exemplary embodiment, a macro controller overlay, micro controller overlay, and global controller overlay are established for specifying macro controller objects, micro controller objects and global controller objects. The MVC tool of the exemplary embodiments of the invention provides editors for each of the plurality of controller overlays.

Figure 4:
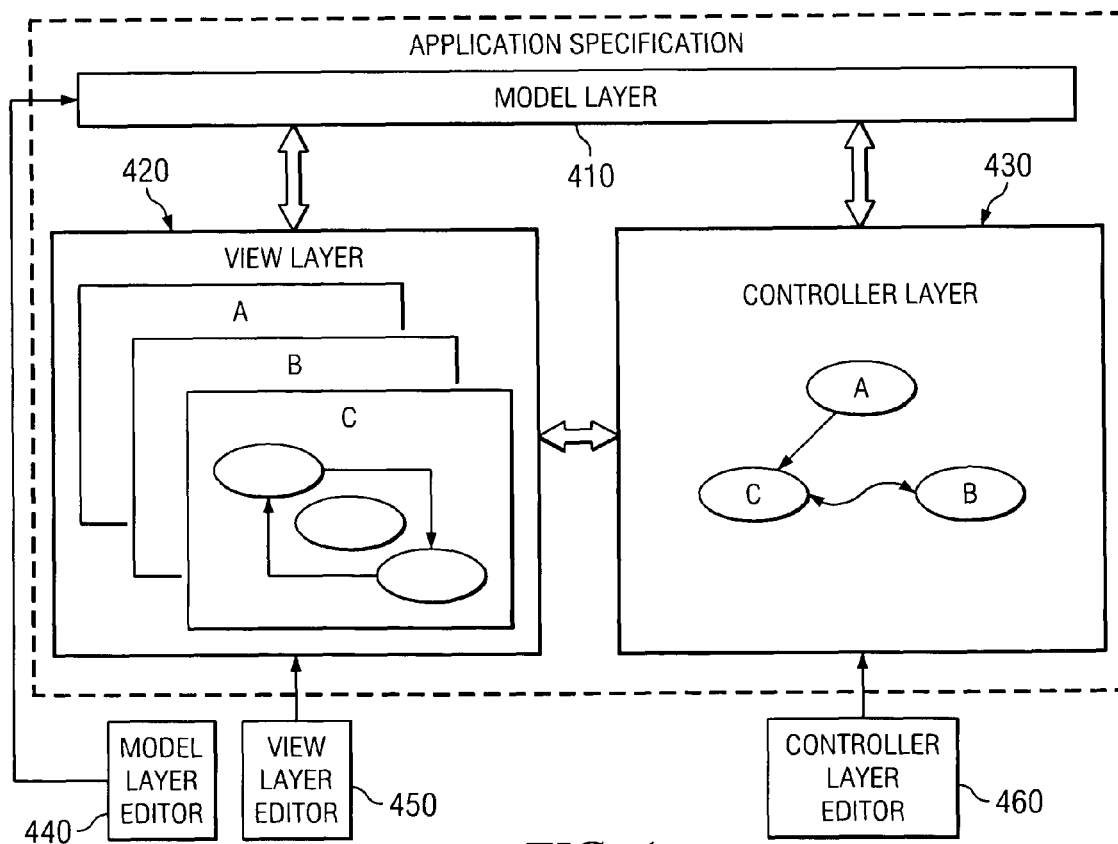
FIG. 4 is a diagram illustrating a known MVC architecture for specifying an application.

FIG. 4 is a diagram illustrating a known MVC architecture for specifying an application. As shown in FIG. 4, the traditional MVC architecture includes a model layer 410, a view layer 420 and a controller layer 430. In the traditional MVC tool, editors 440-460 are provided for each of the model layer 410, view layer 420 and controller layer 430. Thus, with the traditional MVC tool, a user may define an application by creating model objects representative of the data and the logic that manipulates that data using the model layer editor 440. Transitions between model objects may be represented as edges between the model objects and define the interaction of model objects with regard to changes in state. An example of a model object is a Java Bean, which encapsulates the data (properties) and the logic (methods) of an application.

The user may also use the controller layer editor 460 to generate controller objects that define the application specific logic in them. Controllers are often in charge of making sure the views have access to the model objects they need to display and often act as the conduit through which views learn about changes to the model objects. The controller object acts as the intermediary between the application's view objects and its model objects. As with the model objects, transitions between controller objects are specified by edges between these controller objects that designate possible state changes in the application. An example of a controller object is, for example, a login controller object that includes the application specific logic for providing an interface through which a user may login to a server application. Other examples of controller objects include, as for the case of the Struts framework, a controller servlet, developer-defined request handlers, and several other supporting objects.

The user may also define view objects using the view editor 450 which identify the manner by which information generated using the model objects or control interfaces associated with the controller objects are displayed. An example of a view object is a virtual button object that may be displayed via a web browser, a drop down menu object, a graphical window object, and the like. In the case of voice applications, view objects would correspond to markup tags that generate Voice Extensible Markup Language (VXML) forms. The view objects may be reused such that the same view object may be used in a plurality of different applications to generate similar view components in a graphical user interface.

As shown in FIG. 4, the controller layer 430, in a known MVC tool, is used to define the application specific logic, which is herein referred to as "macro" control. Other controls, such as controls that are intrinsic to the nature of specific browser-supported interaction mechanisms, such as input fields, drop down menus, selection lists, etc., which are referred to as "micro" controls, are typically embedded in the view objects of the view layer 420. In addition, global controls which are controls that override micro and macro controls, such as function keys, navigation buttons in browsers, right-click context menus, and the like, are also embedded in the view objects of the view layer 430.

The generation of an application using a MVC tool according to that illustrated in FIG. 4 is generally known in the art. One of the drawbacks of the traditional MVC tool is the level of specificity for defining controller objects. That is, a single controller layer is provided in known MVC tools in which all of the controller objects must be defined. Because of this single layer of control objects, application developers typically use the controller layer to only specify the application specific logic. Other controls, such as the micro controls and global controls discussed above, are embedded in other layers of the MVC architecture, e.g., view objects in the view layer. This becomes troublesome when the means by which a user interacts with the application is other than a traditional interface. That is, the MVC tools known to those of ordinary skill in the art are designed under the assumption that a user will interface with the application through a traditional Display-Mouse-Keyboard (DMK) interface. When other modalities of the interfacing with the application are provided, either in addition to, or in replacement of, these traditional interface modalities, additional logic is necessary to implement controls. Because these controls are typically embedded in view objects, it becomes difficult and cumbersome to define the application controls using objects in a single controller layer that must interface with embedded controls within view objects. The separation of the view layer from the controller layer becomes blurred and the result is a large collection of objects that are indistinguishable between controller objects and view objects.

The exemplary embodiments of the invention improve upon known MVC tools by providing a system and method for defining controller objects in a plurality of different controller overlays. In exemplary embodiments of the invention, each controller overlay represents an abstraction of the controller layer for various levels of control. In one exemplary embodiment, these controller overlays include a macro control overlay, a micro controller overlay, and a global controller overlay.

Figure 5:
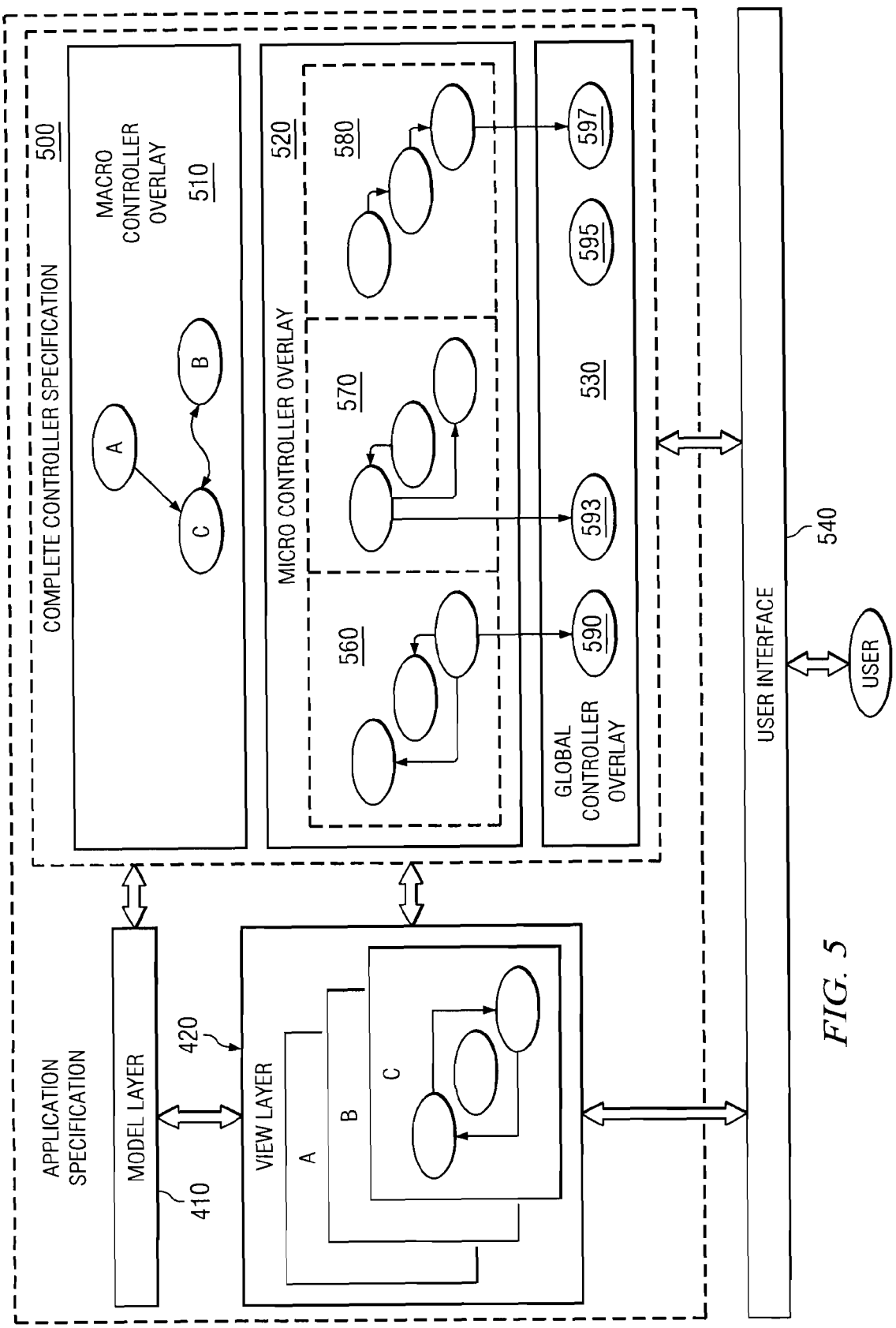
FIG. 5 is a diagram illustrating a MVC architecture in which the controller layer is partitioned into a plurality of overlays in accordance with exemplary aspects of the invention.

FIG. 5 illustrates the controller layer of an MVC tool in accordance with one exemplary embodiment of the invention. As shown in FIG. 5, the macro controller overlay 510, micro controller overlay 520, and global controller overlay 530 combine to make the complete controller 500, i.e. the controller layer of the MVC tool. The complete controller 500 communicates with one or more user interfaces 540. The user interfaces 540 provide a means by which the application user 550 may supply input and receive output from the application.

The macro controller overlay 510 refers to the classic transition of the application from one state, view, page or dialog into another. The macro controller overlay 510 corresponds to the controller element of a traditional MVC application controller layer that implements the application specific controls. Macro controller overlay 510 objects include transitions effected due to business or application logic. For example, the macro controller overlay 510 would determine, in a banking application, the action of requesting the account balance for a given user and proceeding to the "show results" page.

The micro controller overlay 520 represents the intrinsic browser-supported interaction mechanisms, such as input fields, selection lists, etc. The micro controller overlay 520 permits interaction mechanisms represented by objects within this overlay 520 to provide their own flow control that is not visible to other layers of control. The micro controller overlay 520 can be specific to particular modalities, such as speech or graphical modalities. For example, in a point-and-click application, micro controller overlay 520 objects may include input fields that perform simple validation. In a speech control based application, micro controller overlay 520 objects may include, for example, timeouts, prompt rewording, utterance rejections, and confidence-driven flows to encapsulate input field controls.

The global controller overlay 530 refers to the meta-control of an application that allows users to override the macro or micro control layers. For example, global controller overlay 530 objects allow a user to preempt normal application flow to execute global help, stop an application, resume an application, or to restart an application from the beginning. Global controls are typically initiated by a user of the application. In graphic user interfaces, global controls can be implemented in many different ways including navigation buttons in browsers, dedicated function keys (e.g., F1, F5, etc.), right-click context menus, etc. Global controls may also be application specific, such as navigation bars, or browser frames.

As shown in FIG. 5, the macro-controller overlay 510 includes a plurality of macro controller components A, B and C that represent sets of one or more macro controller objects that implement application specific logic. A plurality of views is associated with the macro controller components A, B and C in the view layer of the MVC architecture. To each of these views, a micro controller 560-580, represented as a set of one or more micro controller objects, is associated. The micro controller objects within these micro controllers 560-580 represent elements of the view pages A, B, C of the application.

Finally, to elements of these view pages A, B, C in the micro controllers 560-580, global controller objects 590-597 may be associated. The global controller objects 590-597 may represent global events in the application, e.g., disconnect, transfer, help, start-over, etc.

The combination of the macro controller overlay 510, micro controller overlay 520, and global controller overlay 530 results in a complete controller specification 500 for an application. The separation of the controller layer 500 of a MVC architecture into these overlays 510-530 permits increased reuse of objects from each of these overlays 510-530, specification of controllers with regard to specific modalities of input/output, and overall ease of designing and integrating controller objects into the application model.

In the depicted exemplary embodiment, the invention provides a system that permits a user to access editors for each of the macro, micro and global controller overlays to define the controllers for the application. Various editor engines are provided in which the user may generate objects for the various controllers in the various controller layers and link these controller objects in order to achieve the controls desired in the application being generated.

For example, at each of the three controller layers, i.e. macro, micro and global, the pertinent controller objects are created. The aggregation of the behaviors of the three layers will conform to the global controller behavior. However, each of the layers are realized (or implemented) in objects, code or artifacts pertinent to different MVC dimensions. For example, the macro controller objects may be implemented in objects pertinent to the C layer in MVC, while micro controller layer may generate artifacts and code pertinent to the V layer and the global controller layer may produce both V and C artifacts. The exemplary embodiments of the invention permit the decomposition of the controller into layers that facilitate implementation and improve the user interface of an application, e.g., a voice web application, while the total controller is really the collection or aggregation of the three layers of control, regardless of where they are implemented.

Figure 6:
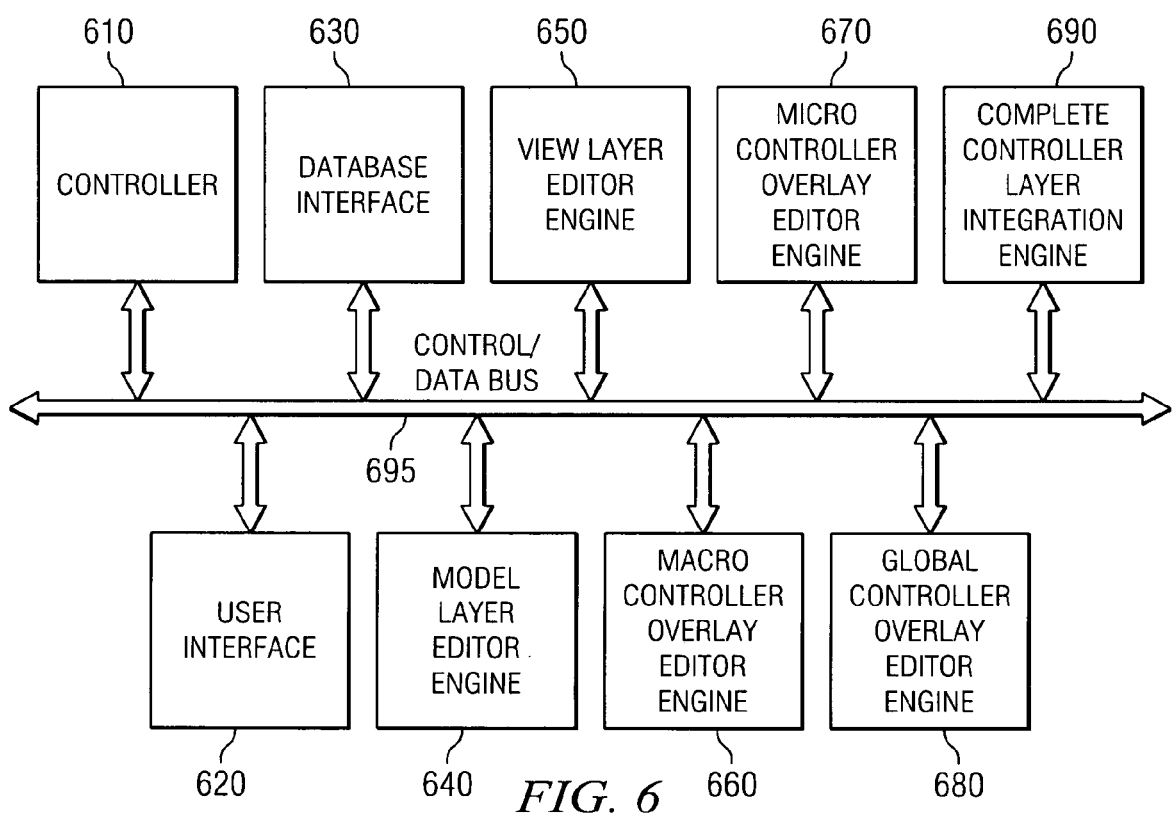
FIG. 6 is an exemplary block diagram of a MVC tool in accordance with exemplary aspects of the invention.

FIG. 6 is an exemplary block diagram of a MVC tool in accordance with one exemplary embodiment of the invention. The elements 610-690 shown in FIG. 6 may be implemented in hardware, software, or any combination of hardware and software. For example, in one exemplary embodiment of the invention, the elements 610-690 in FIG. 6 are implemented as software instructions executed by one or more processors.

As shown in FIG. 6, the MVC tool, in accordance with the exemplary embodiments of the invention, includes a controller 610, a user interface 620, a database interface 630, a model layer editor engine 640, a view layer editor engine 650, a macro controller overlay editor engine 660, a micro controller overlay editor engine 670, a global controller overlay editor engine 680, and a complete controller layer integration engine 690. The elements 610-690 are in communication with one another via the control/data bus 695. Although a bus architecture is shown in FIG. 6, the present invention is not limited to such and any architecture that facilitates the communication of control/data messages between the elements 610-690 may be used without departing from the spirit and scope of the present invention.

The controller 610 controls the overall operation of the MVC tool and orchestrates the operation of the other elements 620-690. The user interface 620 provides a communication interface through which input from a user may be received and output may be transmitted for output via an output device for use by the user. For example, the user interface 620 may include a network interface for receiving and transmitting data with one or more networks for routing from and to a client device. The database interface 630 provides an interface through which data and application objects may be accessed in one or more databases (not shown). For example, reusable objects may be referenced from established databases, objects generated using the exemplary embodiments of the invention may be stored in one or more databases, and the like.

A model layer editor engine 640 and a view layer editor engine 650 provide editors through which a user may define the model and view layers of an application. For example, the model layer editor engine 640 may be used to create model objects and combine model objects to define the data and methods for operating on the data for an application. The view layer editor engine 650 may be used to create view objects and combine view objects to define views for presenting information associated with the application. The model layer editor engine 640 and view layer editor engine 650 operate in a manner generally known in the art, e.g., these engines operate in a similar manner to known MVC tools.

As shown in FIG. 6, rather than having a single controller layer editor, the exemplary embodiments of the invention provide three controller overlay editors 660-680 for defining various overlays of control that together define a complete controller layer for the application. The macro controller overlay editor engine 660 provides an editor interface through which a user may define the underlying application specific logic for controls of the application. The micro controller overlay editor engine 670 provides an editor interface through which a user may define controls that are intrinsic or integrated in views of application. The global controller overlay editor engine 680 provides an editor interface through which a user may define global controls for preempting micro and macro controls. In each of these editors presented by the various editor engines 660-680, a user may generate controller objects and combine controller objects to generate macro, micro and global controllers as well as define the relationships between these various controllers.

For example, the user may use the macro controller overlay editor engine 660 to generate the macro controllers, similar to known controller layer controls, that interface between the application model layer objects and the application views in the application view layer. The micro controller overlay editor engine 670 may be used by the user to establish micro controllers for elements of the views established in using the view layer editor engine 650 and link these micro controllers to those views. The global controller editor engine 680 may be used by the user to generate global controllers that are linked to the micro controllers generated using the micro controller overlay editor engine 670.

The complete controller layer integration engine 690 uses the controllers generated by the macro, micro and global controller overlay editor engines 660-680 and the established links between these controllers and the links between the controllers and the views to generate a complete controller specification for the application. The complete controller specification may then be used along with the application model generated using the model layer editor engine 640 and the views in the view layer editor engine 650 to implement the application. The established complete controller, model and views may be stored in a database or other storage for later use.

Thus, the exemplary aspects of the invention provide separate editor interfaces for a user to establish an application model, application views, application macro control, application micro control, and application global control. In this way, the need to embed controls in views is eliminated and a pure separation of model, view and control may be obtained. This is especially important with regard to voice or speech-based control of web applications. That is, known application development tools that support the MVC architecture concentrate only on the macro control layer to specify all of the controls of the application. This is because known application development tools assume a traditional graphical user interface (GUI) which can easily separate data input from control input and separate various types of control. Thus, there are built-in dedicated mechanisms in GUIs for implementing different types of controls. Such mechanisms are not present for voice or speech based control in applications.

Voice or speech applications get their input from a single acoustic communication channel. Thus, a voice application receives its control flow input and its data input on the same channel. In addition, voice applications also receive various types of control in an intermixed control flow on the single acoustic channel. Thus, in order to make development of voice or speech based applications easier to implement, the exemplary embodiments of the invention separate out the various types of control into various control overlays. The voice channel will capture the input pertinent to any of the three controller layers. The overall application callflow is perceived by the end user as a single flow, but its implementation in accordance with the current invention is realized in three layers. Thus, the application development is simpler while the user interface remains unchanged to the end user. Again, the overall controller now is experienced by the application user because of the superposition of the three controller layers.

Figure 7:
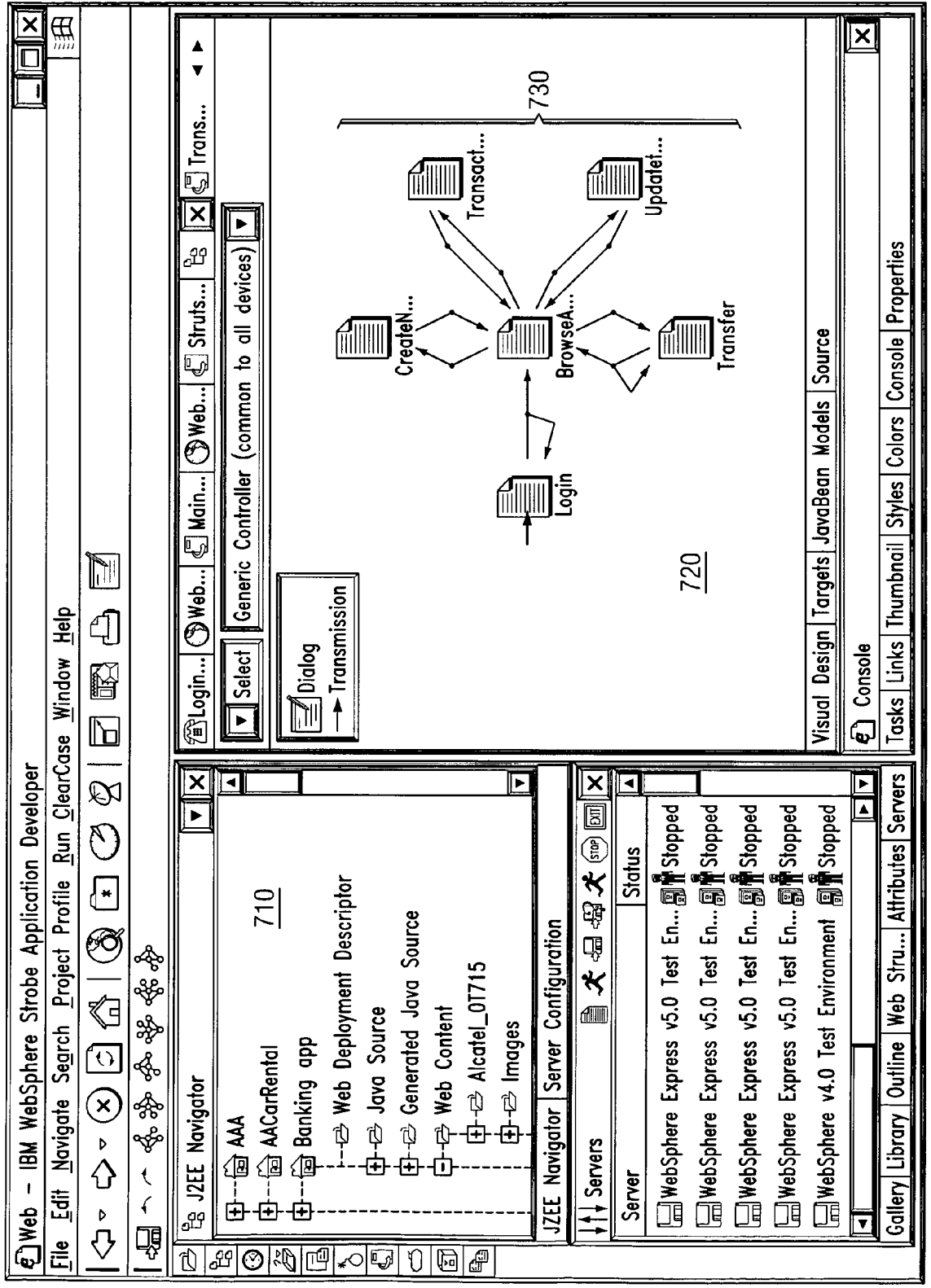
FIG. 7 is an exemplary diagram of a macro controller overlay editor in accordance with exemplary aspects of the invention.

FIG. 7 is an exemplary diagram of a macro controller overlay editor in accordance with one exemplary embodiment of the invention. As shown in FIG. 7, the macro controller editor 700 includes a navigator window 710 for navigating the various applications associated with a particular server, servlet, or the like. Another window 720 is provided for establishing a macro controller for an application. As shown in FIG. 7, a plurality of objects 730 may be generated and combined to establish a macro controller. The edges between objects represent transitions between states of the macro controller.

In such a representation of the macro controller, the edges denote a transition. Such transition is typically done through a controller servlet across pages. In this transition the pages can submit attributes to the controller servlet and to the model bean, and conditions might be used to determine the target page. In such a graph, the nodes represent the views or pages. The controller (graph and action servlet) relates the views (nodes) with the model (which might provide the values that condition the transitions in the graph).

Similar editors may be provided for the micro and global controller editors. The graphical visualization of these two other controller layers is straight forward in view of the above description. That is, the global controller refers to transitions between any application state and a global handler. For the micro controller layer, the transitions are handled by local "states" in the application views and thus no cross-page transitions are typical.

The micro controller editor may have links to the views established by the view layer editor. The global controller editor may include links to micro controllers. While the editors may be similar with regard to the interface through which the controllers are generated, the controllers are generated for different controller overlays of the application, e.g., macro, micro and global controller overlays. In this way, all of the controls for the application may be designated in controller overlays rather than having to be embedded in the view layer. In other words, the view perspective becomes more clean as more application code migrates to the three controller layers provided by the exemplary embodiments of the invention. This simplifies the designation of the controller layer such that more complex interfaces, such as voice or speech interfaces, may be defined in a much simpler and more intuitive manner.

Figure 8:
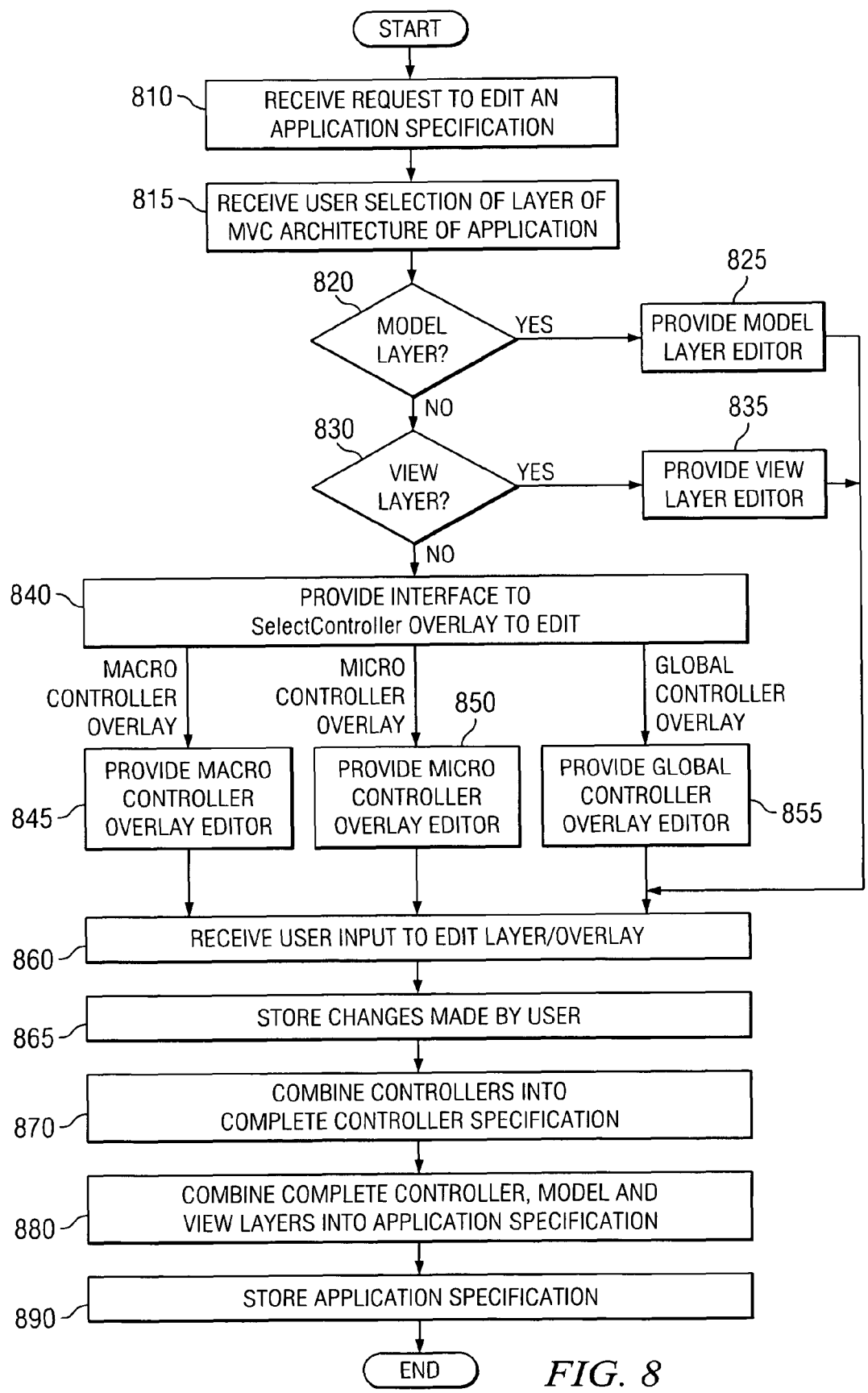
FIG. 8 is a flowchart outlining an exemplary operation of the invention when generating an application.

FIG. 8 is a flowchart outlining an exemplary operation according to one exemplary embodiment of the invention for generating an application specification. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 8, the operation starts by receiving a request to edit an application specification (step 810). A user selection of a layer of the MVC architecture of an application is received (step 815). If the user selection is for a model layer of the application (step 820), then a model layer editor is provided for defining an application model (step 825). If the user selection is for a view layer of the application (step 830), then a view layer editor is provided for defining an application view (step 835).

If the user selection is not for the model or view layers, then it is a selection of the controller layer of the application. An interface is provided to the user for selecting one of a macro, micro or global controller overlay that is to be edited (step 840). If the user selects a macro controller overlay to be edited, a macro controller overlay editor is presented through which a user may edit a macro controller overlay of the application (step 845). If the user selects a micro controller overlay to be edited, a micro controller overlay editor is presented through which a user may edit a micro controller overlay of the application (step 850). If the user selects a global controller overlay to be edited, a global controller overlay editor is presented through which a user may edit a global controller overlay of the application (step 855).

User input is then received for editing the selected layer/overlay of the application (step 860). When a user selects an exit option or save option, the changes made by the user input are stored in association with the selected layer/overlay (step 865). The various controller overlays are then combined into a complete controller specification (step 870). The complete controller specification, the model layer, and the view layer are then combined into an application specification (step 880). The application specification is stored (step 890) and the operation terminates.

Thus, the exemplary embodiments of the invention provide a mechanism for separating out the definition of a controller layer in an application that is generated in accordance with the MVC architecture. The exemplary embodiments of the invention separate the controller layer into a plurality of controller overlays that represent different levels of control within the application. The exemplary embodiments of the invention further provide a mechanism by which all of the control of an application may be designated in controller overlays rather than embedding portions of the control in the view layer. This simplifies the definition of the application making generation and editing of the application easier and more intuitive.

It should be appreciated that while the exemplary embodiments of the invention has been described in terms of three controller overlays, i.e. the micro, macro and global controller overlays, these are only exemplary. The number of controller overlays is not limited to these three and other controller overlays may be used in addition to, or in replacement of, one or more of the controller overlays described herein. Various levels of controller specification may be obtained using the exemplary embodiments of the invention.

It is important to note that while the exemplary embodiments of the invention has been described in the context of a fully functioning data processing system, those of ordinary skill in the art will appreciate that the processes of the exemplary embodiments of the invention are capable of being distributed in the form of a computer readable medium of instructions and a variety of forms and that the exemplary embodiments of the invention apply equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the exemplary embodiments of the invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for defining a controller layer of an application using a model-view-controller architecture, comprising:
providing the model-view-controller architecture with a model layer, a view layer and a controller layer;
separating the controller layer of the model-view-controller architecture into a plurality of controller overlays, wherein the plurality of controller overlays comprise a macro overlay for transitioning the application between states, views, pages, and dialogues of the application, a micro overlay for providing flow control to a specific modality of the application, and a global overlay for preempting application flow to perform at least one action selected from the group consisting of executing a global help, stopping the application, resuming the application, or restarting the application;
implementing at least one object of the view layer into an object of the micro overlay or into an object of the global overlay;
generating a macro controller, wherein the macro controller is generated by a macro controller overlay engine editor, and wherein the macro controller interfaces between an object of the model layer and an object of the view layer;
generating a micro controller for the object of the view layer, wherein the micro controller is generated by a micro controller overlay engine editor, and wherein the micro controller is linked to the object of the view layer;
generating a global controller, wherein the global controller is generated by a global controller overlay engine editor, and wherein the global controller is linked to the micro controller generated by the micro controller overlay engine editor; and
combining the controllers in each of the plurality of controller overlays into a complete controller specification for model-view-controller architecture of the application.

2. The method of claim 1, further comprising:
combining the complete controller specification for the application with a model layer and view layer of the model-view-controller architecture of the application; and
implementing the application using the combination of the complete controller specification, the model layer and the view layer of the model-view-controller architecture of the application.

3. The method of claim 2, wherein the macro controller overlay defines application specific logic for interfacing between the model layer and the view layer.

4. The method of claim 2, wherein the micro controller overlay defines intrinsic controls of views in the view layer.

5. The method of claim 2, wherein the global controller overlay defines global controls for overriding micro and macro controls in the micro and macro controller overlays.

6. The method of claim 4, wherein the intrinsic controls of views in the view layer of the micro controller overlay are specific to a speech modality.

7. The method of claim 4, wherein the intrinsic controls of views in the view layer of the micro controller overlay are intrinsic web browser-supported interaction mechanisms that are controlled using speech input from a user.

8. The method of claim 2, wherein the micro controller overlay has its own flow control that is not visible to the macro controller overlay or global controller overlay.

9. The method of claim 1, wherein the editors include a graphical user interface for defining nodes representing states of the controllers in a particular controller overlay and edges between nodes representing transitions between states of the controllers in the particular controller overlay.

10. A computer program product in a recordable-type computer readable medium for defining a controller layer of an application using a model-view-controller architecture, comprising:
first instructions for providing the model-view-controller architecture with a model layer, a view layer and a controller layer;
second instructions for separating the controller layer of the model-view-controller architecture into a plurality of controller overlays, wherein the plurality of controller overlays comprise a macro overlay for transitioning the application between states, views, pages, and dialogues of the application, a micro overlay for providing flow control to a specific modality of the application, and a global overlay for preempting application flow to perform at least one action selected from the group consisting of executing a global help, stopping the application, resuming the application, or restarting the application;
third instructions for implementing at least one object of the view layer into an object of the micro overlay or into an object of the global overlay;
fourth instructions for generating a macro controller, wherein the macro controller is generated by a macro controller overlay engine editor, and wherein the macro controller interfaces between an object of the model layer and an object of the view layer;
fifth instructions for generating a micro controller for the object of the view layer, wherein the micro controller is generated by a micro controller overlay engine editor, and wherein the micro controller is linked to the object of the view layer;
sixth instructions for generating a global controller, wherein the global controller is generated by a global controller overlay engine editor, and wherein the global controller is linked to the micro controller generated by the micro controller overlay engine editor; and
seventh instructions for combining the controllers in each of the plurality of controller overlays into a complete controller specification for model-view-controller architecture of the application.

11. The computer program product of claim 10, further comprising:
eighth instructions for combining the complete controller specification for the application with a model layer and view layer of the model-view-controller architecture of the application; and
ninth instructions for implementing the application using the combination of the complete controller specification, the model layer and the view layer of the model-view-controller architecture of the application.

12. The computer program product of claim 11, wherein the macro controller overlay defines application specific logic for interfacing between the model layer and the view layer.

13. The computer program product of claim 11, wherein the micro controller overlay defines intrinsic controls of views in the view layer.

14. The computer program product of claim 11, wherein the global controller overlay defines global controls for overriding micro and macro controls in the micro and macro controller overlays.

15. The computer program product of claim 13, wherein the intrinsic controls of views in the view layer of the micro controller overlay are specific to a speech modality.

16. The computer program product of claim 13, wherein the intrinsic controls of views in the view layer of the micro controller overlay are intrinsic web browser-supported interaction mechanisms that are controlled using speech input from a user.

17. The computer program product of claim 11, wherein the micro controller overlay has its own flow control that is not visible to the macro controller overlay or global controller overlay.

18. A system for defining a controller layer of an application using a model-view-controller architecture, comprising:
- means for providing the model-view-controller architecture with a model layer, a view layer and a controller layer
- means for separating the controller layer of the model-view-controller architecture into a plurality of controller overlays, wherein the plurality of controller overlays comprise a macro overlay for transitioning the application between states, views, pages, and dialogues of the application, a micro overlay for providing flow control to a specific modality of the application, and a global overlay for preempting application flow to perform at least one action selected from the group consisting of executing a global help, stopping the application, resuming the application, or restarting the application;
- means for implementing at least one object of the view layer into an object of the micro overlay or into an object of the global overlay;
- means for generating a macro controller, wherein the macro controller is generated by a macro controller overlay engine editor, and wherein the macro controller interfaces between an object of the model layer and an object of the view layer;
- means for generating a micro controller for the object of the view layer, wherein the micro controller is generated by a micro controller overlay engine editor, and wherein the micro controller is linked to the object of the view layer;
- means for generating a global controller, wherein the global controller is generated by a global controller overlay engine editor, and wherein the global controller is linked to the micro controller generated by the micro controller overlay engine editor;
- means for combining the controllers in each of the plurality of controller overlays into a complete controller specification for model-view-controller architecture of the application;
- means for combining the complete controller specification for the application with a model layer and view layer of the model-view-controller architecture of the application; and
- means for implementing the application using the combination of the complete controller specification, the model layer and the view layer of the model-view-controller architecture of the application.

* * * * *